United States Patent [19]

Pook et al.

[11] 4,024,833

[45] May 24, 1977

[54] BURGEES

[76] Inventors: Ian Michael Pook, Neston, Corsham, Wiltshire, England; George Herbert Lee, Willowbrook, Lon Hawen, Abersoch, Pwllheli, Gwynedd, LL53 7EW, Wales

[22] Filed: Dec. 11, 1975

[21] Appl. No.: 639,732

[52] U.S. Cl. .................................. 116/173; 73/188; 116/174

[51] Int. Cl.² .................... G01W 1/00; G09F 17/00

[58] Field of Search ............. 73/188, 189; 116/173, 116/174, 175

[56] References Cited

UNITED STATES PATENTS

| 721,348 | 2/1903 | Wilson | 73/188 |
|---|---|---|---|
| 1,383,234 | 6/1921 | Raguse | 116/173 |
| 1,742,574 | 1/1930 | Breedlove | 73/188 |
| 2,465,999 | 4/1949 | Brady | 73/188 |

Primary Examiner—S. Clement Swisher
Assistant Examiner—Denis E. Corr
Attorney, Agent, or Firm—Seidel, Gonda & Goldhammer

[57] ABSTRACT

A burgee, particularly for boats and yachts, comprising a frame supported by pivot bearing means on the upper end of a staff has a detachable flag. The flag may be fitted on a frame, for example a wire frame, adapted to be coupled to the frame supported on the staff, the latter frame preferably being made from resilient strip material such as spring steel. The flag frame is preferably clipped into upper and lower locating holes in the staff-supported frame.

9 Claims, 2 Drawing Figures

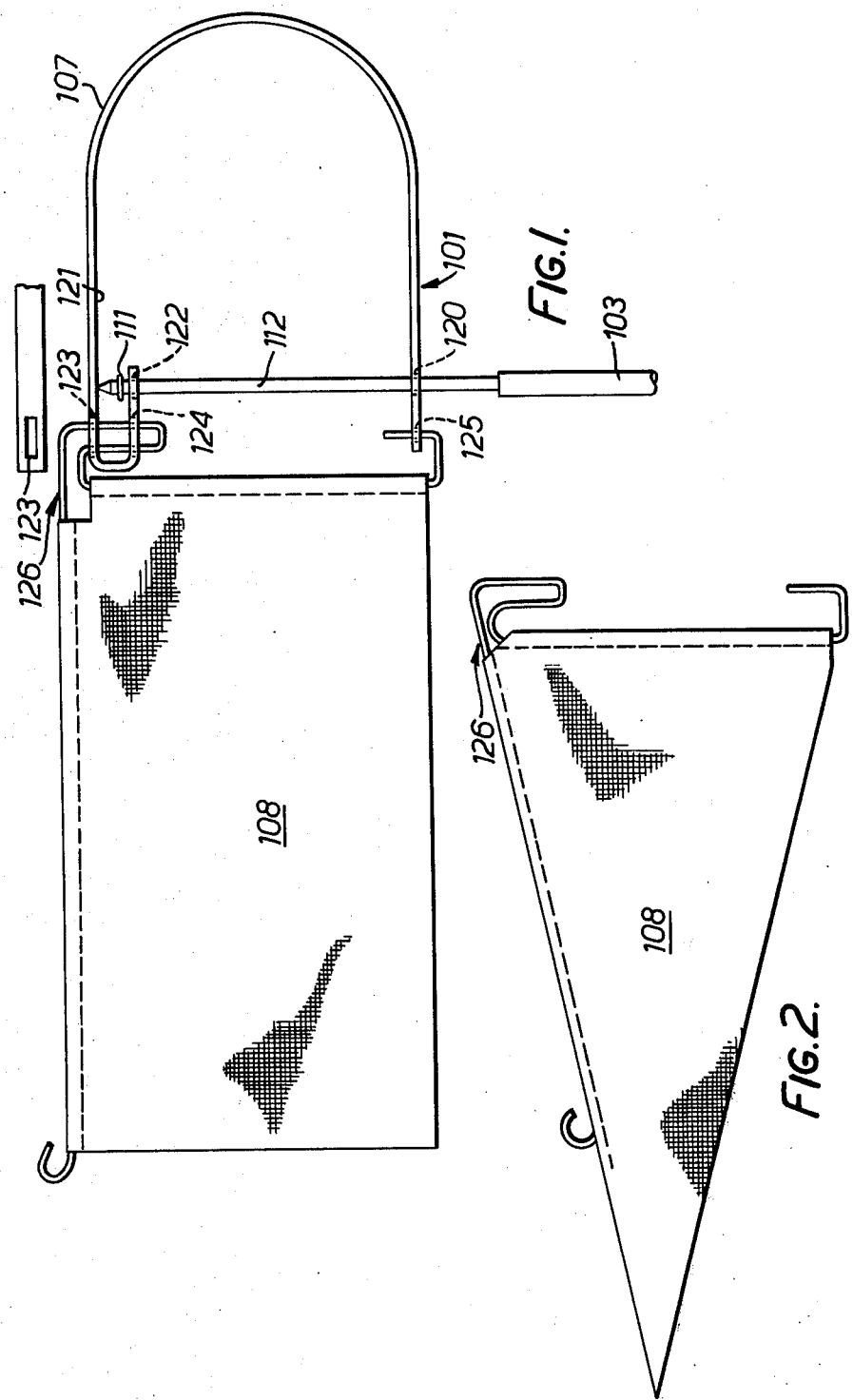

BURGEES

FIELD OF THE INVENTION

The invention relates to burgees, particularly for boats and yachts.

Burgees generally comprise a frame, often of wire, arranged to carry a flag and to be carried on a staff which can be secured to the top of a mast of a marine vessel to indicate the direction of the prevailing wind. The frame is rotatable on the staff so that the flag assumes positions about the mast dictated by the wind direction. The speed and accuracy with which the wind direction is indicated primarily depends upon the friction between the frame supporting the flag and the staff upon which the frame is mounted.

In the case of sailing vessels, particularly when a vessel is being sailed in racing events, it is important that the frame rotates easily on the staff with a minimum of friction so that the flag responds quickly to the lightest wind, and the yachtsman can then use this to the maximum advantage.

The co-pending U.S. patent application Ser. No. 639,731 filed of even date herewith by George H. Lee, co-inventor of the invention the subject of this application, is concerned with the use of a pivot bearing to support the frame on the staff with minimum friction.

SUMMARY OF THE INVENTION

We have now found that the said burgee incorporating pivot bearing means can be improved by making the flag readily detachable and replaceable. When yachting it is the practice to fly a flag of one shape when crusing and to fly a flag of a different shape when racing. The capability of changing flags readily without the need to detach the staff from the mast and fit a completely new unit is extremely advantageous, as well as representing a considerable saving in time and cost to the yachtsman.

In accordance with the present invention there is provided a burgee comprising a staff, first frame means, pivot bearing means between the staff and said first frame means permitting said frame means to be mounted on the staff for rotational movement about the axis of the staff, and second frame means carrying a flag, said second frame means being adapted to be detachably coupled to said first frame means.

This enables the replacement of flags to be carried out easily and quickly. The frame carried by the staff is preferably of spring steel strip to provide a resilience to enable the flag assembly, i.e. flag and frame, to be clipped into the staff-supported frame.

Preferably, the frame mounted on the staff co-acts with the staff at two vertically spaced places, apart from the pivot bearing, to provide support and guidance for the frame. The frame may be formed with a loop on the side of the staff opposite the flag as a counterbalance to the weight of the flag.

BRIEF DESCRIPTION OF THE DRAWINGS

A preferred form of burgee in accordance with the invention will now be described by way of example and with reference to the accompanying drawings, in which:

FIG. 1 is a schematic view of the burgee according to the invention;

FIG. 2 shows an alternative shape flag for attachment to the frame of the burgee of FIG. 1.

It is the practice when yachting to fly a rectangular shape flag when racing, and to fly a triangular shape flag when cruising. The form of burgee shown in FIGS. 1 and 2 is designed to enable the yachtsman to change from one shape of flag to the other readily and without difficulty. By designing the flag to be readily detachable from the rest of the burgee it also means that a flag can be replaced by a new flag at little cost. The burgee comprises a cylindrical staff 103, for example of aluminium, with at its upper end a length of stainless steel rod 112 which terminates at its upper end in a pivot point on the axis of the staff. Just below the pivot point there is provided a circlip 111 to prevent the frame lifting off the rod 112. The frame 101 is made of spring steel strip of rectangular cross-section. The strip is bent to form a balancing loop 107 and is provided with a circular hole 120 through which the rod 112 pass and by which the rod is laterally supported and guided. The upper web of the frame 101 defines the flat bearing surface 121 for the pivot point on the rod 112 and is continued around to form a C-shaped end with the extreme end of the strip having a hole 122 therethrough to receive the rod 112, again providing lateral support and guidance for it. The upper and lower arms of the C-shaped portion of the frame are each provided with a rectangular slot 123, 124 in vertical alignment. The other, lower end of the strip frame 101 is provided with a hole 125 therethrough substantially vertically beneath the slots 123, 124.

The flag 108 is fitted on a wire frame 126, for example of stainless steel, and the flag and its frame are arranged to be detachably fitted to the frame 101. The flag frame 126 is formed from a single length of wire suitably bent to provide a horizontal limb, a downwardly projecting loop, a vertical limb, and an upturned hook. The flag 108 is appropriately fastened to the horizontal and vertical limbs of the wire frame 126, such as by sewing or an adhesive for the case of a flag of fabric material, and the downwardly projecting loop and upwardly extending hook of the frame 126 are respectively fitted through the slots 123, 124 and through the hole 125 in the frame 101. The resilient action of the spring steel strip from which the frame 101 is made will retain the flag and its frame 126 in position.

In order to remove the flag, such as the rectangular flag shown in FIG. 1, it is an easy matter to part the wire frame 126 from the strip frame 101 and to clip into place a new flag, such as the triangular shape flag shown in FIG. 2. As shown in FIG. 1 the wire forming the flag frame 126 preferably extends out beyond the flag itself so that a portion can be cut off or so that it can be appropriately bent to balance the weight on its side of the staff against the weight on the other side of the staff.

We claim:

1. A burgee comprising a staff, first frame means having upper and lower substantially horizontal limbs, pivot bearing means between said staff and the upper limb of said first frame means permitting said first frame means to be mounted on the staff for rotational movement about the axis of the staff, and second frame means carrying a flag and having upper and lower connector portions adjacent to the margin of the flag which is adjacent to the staff, said second frame means being adapted to be detachably coupled to said first frame means solely by the interengagement of said connector portions with said upper and lower limbs of said first frame means.

2. A burgee as claimed in claim 1, in which said first frame means is at least partly of resilient strip material.

3. A burgee as claimed in claim 1, in which said first frame means comprises a single continuous length of strip material extending to one side of the staff for connection of said second frame means thereto and extending in a loop on the opposite side of the staff to provide a balance weight.

4. A burgee as claimed in claim 1, in which said first frame means co-acts with the staff at two spaced positions along the length of the staff, in addition to the pivot bearing means, to provide support and guidance for said first frame means.

5. A burgee as claimed in claim 1, in which said first frame means comprises a substantially C-shaped strip element extending for the greater part on the side of the staff opposite to the flag, the end portion of the upper limb of the C-shaped element being turned back on itself to form a web parallel to and below the upper limb, the web and the lower limb of the C-shaped element each being apertured for the passage of the staff therethrough, and the lower limb, the upper limb and the web each being apertured on the side of the staff adjacent to the flag to be able detachably to receive portions of said second frame means.

6. A burgee as clamed in claim 1, in which said second frame means is made of a single continuous length of wire.

7. A burgee as claimed in claim 1, in which said second frame means includes two linear portions along which the flag is secured, one of said portions extending parallel to the staff, downwardly projecting hook means engageable with an upper portion of said first frame means, and upwardly projecting hook means engageable with a lower portion of said first frame means.

8. A burgee comprising a staff, first frame means, pivot bearing means between said staff and said first frame means permitting said first frame means to be mounted on the staff for rotational movement about the axis of the staff, and second frame means carrying a flag, said second frame means being adapted to be detachably coupled to said first frame means, said first frame means comprising a substantially C-shaped strip element having upper and lower limbs, said C-shaped element extending for the greater part on the side of the staff opposite to the flag, the end portion of the upper limb of the C-shaped element being turned back on itself to form a web parallel to and below the upper limb, the web and the lower limb of the C-shaped element each being apertured for the passage of the shaft therethrough, and the lower limb, the upper limb and the web each being apertured on the side of the staff adjacent to the flag to be able detachably to receive portions of said second frame means.

9. A burgee comprising a staff, first frame means, pivot bearing means between said staff and said first frame means permitting said first frame means to be mounted on the staff for rotational movement about the axis of the staff, and second frame means carrying a flag, said second frame means being adapted to be detachably coupled to said first frame means, said second frame means comprising two linear portions along which said flag is secured, one of said portions extending parallel to said staff, downwardly projecting hook means engageable with an upper portion of said first frame means, and upwardly projecting hook means engageable with a lower portion of said first frame means.

* * * * *